(12) United States Patent
Thompson et al.

(10) Patent No.: US 6,708,566 B1
(45) Date of Patent: Mar. 23, 2004

(54) AIR GAUGE FOR MEASURING THE GEOMETRY OF PRECISION MACHINED FLUID PASSAGES

(75) Inventors: John Thompson, Caledonia, MI (US); Jon L. Hulsebus, Grandville, MI (US)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 10/372,466

(22) Filed: Feb. 21, 2003

(51) Int. Cl.⁷ .............................. G01L 7/00; G01M 3/02
(52) U.S. Cl. ................... 73/714; 73/700; 73/37
(58) Field of Search ................ 73/714, 700, 37, 73/37.9

(56) References Cited

U.S. PATENT DOCUMENTS

| | | | |
|---|---|---|---|
| 3,667,284 A | * 6/1972 | Amland et al. | 73/37.9 |
| 3,782,171 A | 1/1974 | Watt | |
| 3,822,584 A | 7/1974 | Minix | |
| 4,016,747 A | 4/1977 | Radev | |
| 4,121,451 A | 10/1978 | Radev et al. | |
| 4,367,464 A | 1/1983 | Allen, Sr. et al. | |
| 4,704,896 A | * 11/1987 | Parsons | 73/37.9 |
| 4,753,555 A | * 6/1988 | Thompson et al. | 408/1 R |
| 4,932,240 A | 6/1990 | Weber | |
| 5,152,166 A | 10/1992 | Brock et al. | |
| 5,212,980 A | 5/1993 | Wegmann | |
| 5,653,037 A | 8/1997 | Hasegawa et al. | |
| 6,029,361 A | * 2/2000 | Newman | 33/556 |

FOREIGN PATENT DOCUMENTS

JP    60027806 A    2/1985
WO    WO 90/08299    7/1990

* cited by examiner

*Primary Examiner*—Edward Lefkowitz
*Assistant Examiner*—Andre Allen
(74) *Attorney, Agent, or Firm*—Brooks Kushman P.C.

(57) ABSTRACT

A gauge for measuring the geometry of a fluid passage in a workpiece at precise gauge points in the passage. The gauge includes a probe with an internal gas flow passage extending to a calibrated orifice or port in the probe. Pressure developed in the gas passage when the orifice is at each gauge point is detected whereby the geometry of the passage is established.

15 Claims, 4 Drawing Sheets

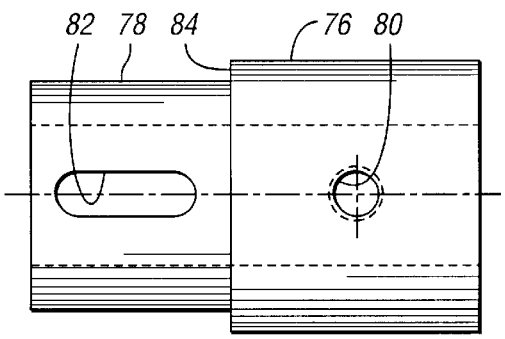
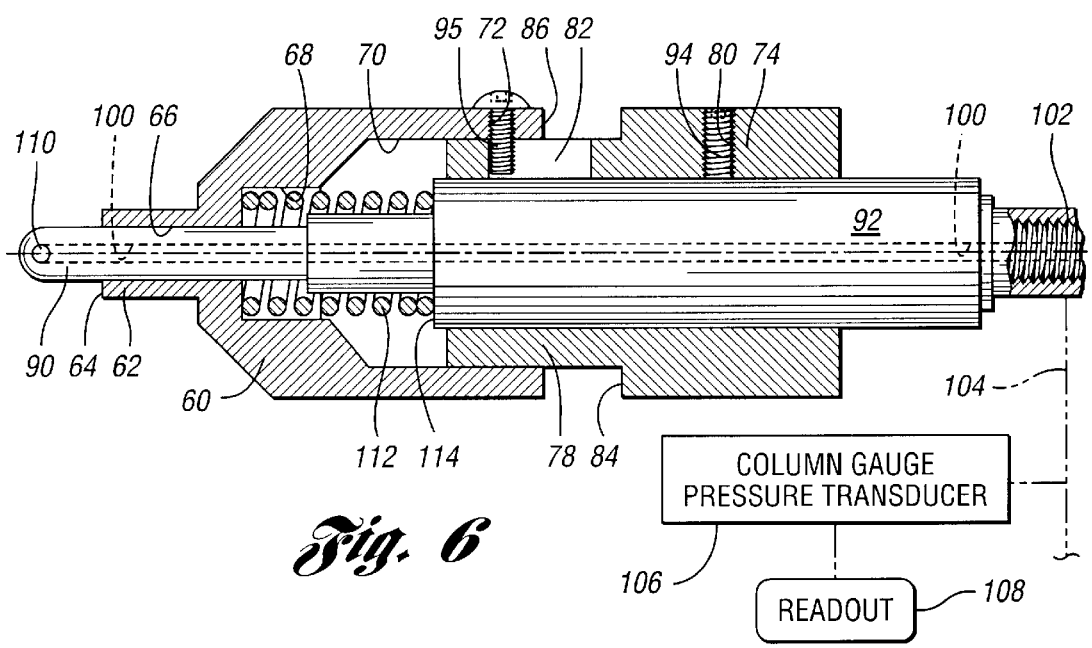
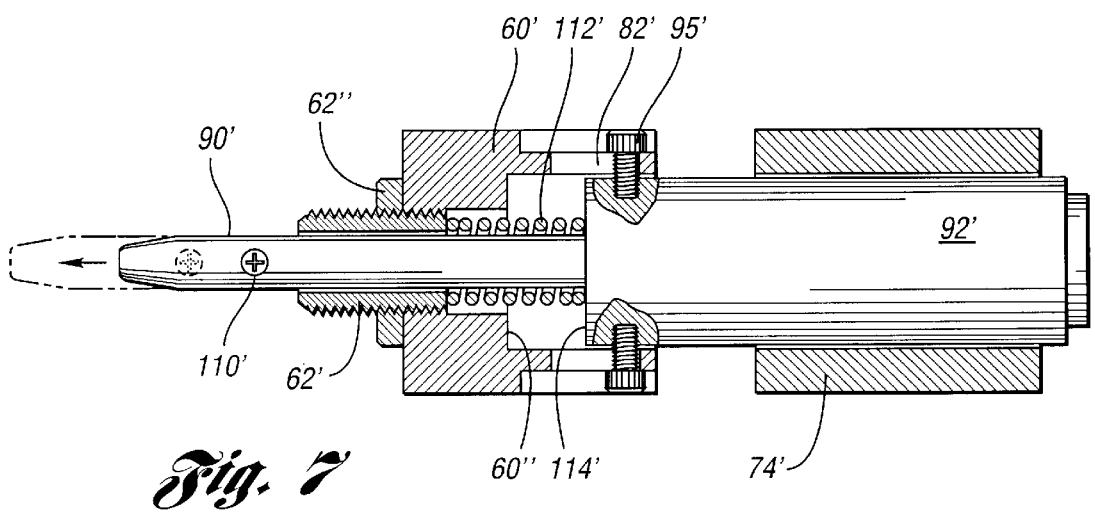

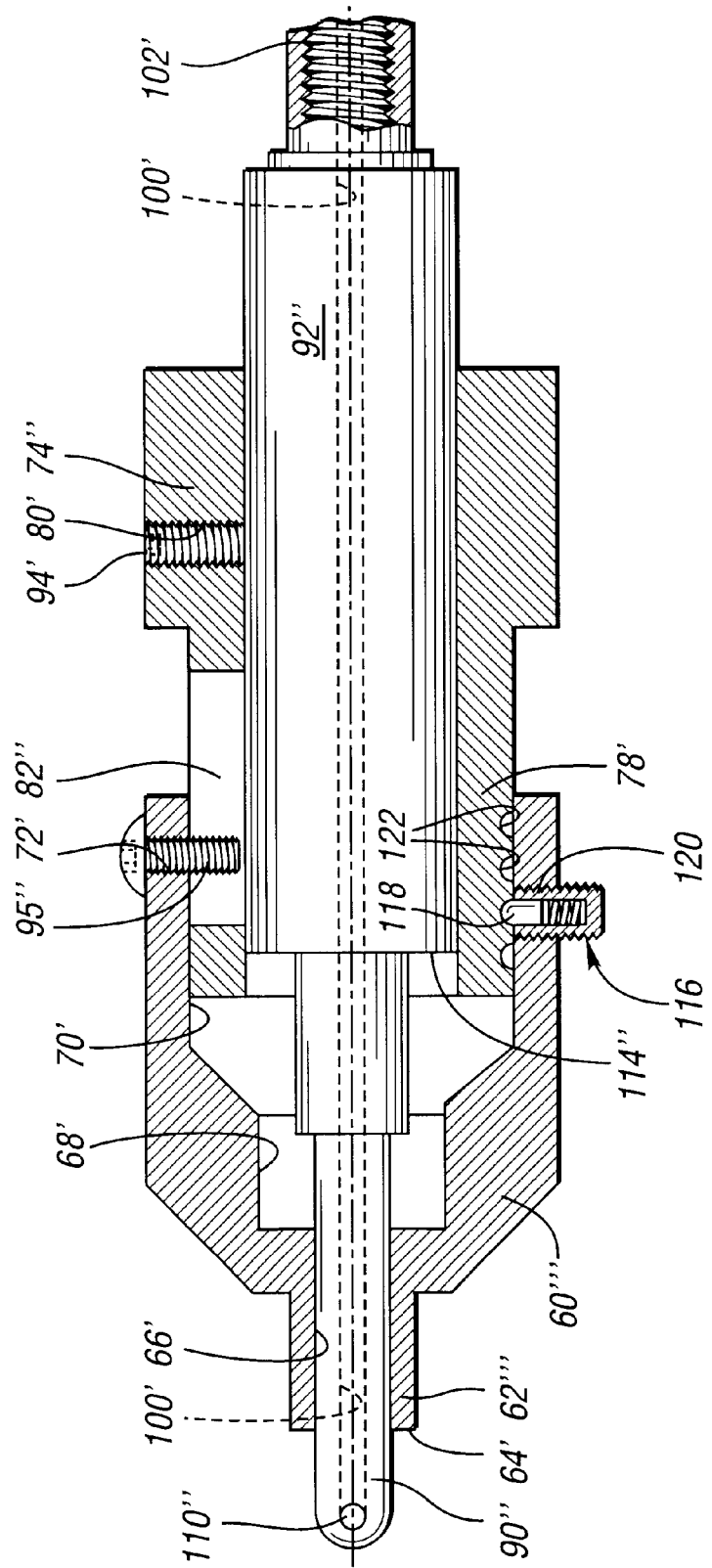

AIR GAUGE FOR MEASURING THE GEOMETRY OF PRECISION MACHINED FLUID PASSAGES

BACKGROUND OF THE INVENTION

1. Field of the Invention

A precision air gauge for measuring the geometry of fluid passages in a fuel injector.

2. Background Art

In the manufacture of fuel injectors, particularly fuel injectors for diesel engines, precision machining of plunger bores, control valve openings, fluid passages and other physical features of an injector pump body or an injector valve body are required. An example of a known injector with precision machined pressure distribution passages may be seen, for example, by referring to U.S. patent application Ser. No. 09/245,106, filed Jan. 29, 1999, which is owned by the assignee of the present invention. That injector, which is commonly referred to as a unit pump, includes an injector pump plunger mounted for reciprocation in a cylindrical bore in a pump body. The bore and the plunger define a pumping chamber, which is pressurized during a fuel injection event as the plunger is stroked by a cam follower driven by an engine camshaft. A control valve body, formed integrally with the pump body, includes a control valve opening that receives a control valve. The control valve opening is in communication with the pumping chamber and with a high pressure distribution circuit that communicates with an injection nozzle formed in a nozzle body.

In the manufacture of a unit pump of this kind, high pressure precision machined passages are required for connecting the pumping chamber with the control valve chamber and for connecting high pressure regions of the assembly to the injection nozzle. Dimensional control of the passages during precision machining of an injector of this kind is critical.

We are aware of prior art air gauges for measuring the quality and dimensions of a machined opening or a fluid passage wherein air pressure is introduced to the opening or the passage through an orifice in the air gauge. The characteristics of the machined opening or the passage can be detected by measuring the air pressure developed at the gauge orifice as a gauge probe is inserted into the passage or into the machined opening. The magnitude of that pressure can be used as an input signal for a pressure sensor to determine variations in the dimensions of the opening or the passage. For example, U.S. Pat. No. 4,704,896 discloses a probe that can be inserted into a drilled, blind opening or passage to detect whether the opening or the passage has internal threads.

Another example of a known air gauge using a probe to measure the characteristics of a machined opening is disclosed in U.S. Pat. No. 3,667,284. That measuring gauge includes a tapered bore with multiple radial jets that communicate with a central air passage. By measuring the back pressure developed at each jet, an operator can determine whether the opening is properly tapered. An equal back pressure at each jet position will indicate that the bore is properly tapered. If the bore is not properly tapered, the back pressure readings will vary.

Air gauges of the kind disclosed in prior art teachings are not practical for obtaining precision readings of the physical characteristics of a fluid pressure passage at precise gauge points. Attempts to use such air gauges to measure the characteristics of a fluid passage at precise depths using a trial-and-error technique generally are unacceptable and not practical for use in a high volume injector manufacturing environment. If an attempt is made to precisely control the depth of the probe using externally mounted gauge blocks, for example, the measurement routine becomes too complex to use on a shop floor in a high-volume manufacturing operation. Further, the results would not be precise enough to meet desired quality standards.

SUMMARY OF THE INVENTION

In the manufacture of an injector of the kind disclosed in the previously identified pending patent application, a long precision-machined passage must be drilled in an injector pump or control valve body to provide fluid communication between the control valve chamber and the source of high injection pressure at the pumping chamber. Following the precision drilling operation, the open end of the passage must be plugged to seal the passage against leakage during operation. For this purpose, it is preferred to use a pin, which is inserted into the passage following the machining operation. The pin can be formed with a shape memory alloy (SMA) and inserted in the opening with minimal pressure (for example, finger pressure). The pin then can be heated so that it will expand to provide a permanent seal. To be effective, the dimensions of the opening must be precise. For this reason, close dimensional tolerances at specified gauge points are required by quality control standards.

The air gauge of the invention includes a probe that can be inserted into a machined fluid pressure passage in the pump or control valve body. The probe extends from a probe body that receives a sleeve secured to the body at a fixed position with respect to the probe. A depth control bushing, according to one embodiment of the invention, is secured to one end of the sleeve by a lost-motion connection that will permit relative movement between the bushing and the sleeve.

A spring is located between the bushing and the probe body so that the probe body normally is biased against a first stop established by the lost motion connection. When the probe is inserted in the passage, a first gauge point is established when the bushing engages a stop surface on the pump or control valve body. The sleeve then can be moved to advance the probe within the passage until a second stop on the sleeve engages a stop surface on the bushing. In this way, two precise gauge points are established in the opening, and air pressure measurements are taken at each point. By comparing the measurements, it can be determined whether a desired degree of taper in the passage is present following the machining operation. Further, out-of-roundness of the passage and deviations in diameter for the passage can also be detected. These characteristics of the pressure passage, particularly measurements of the taper of the passage, can readily be obtained with the required precision and with repeatable inspection results.

In an alternate embodiment of the gauge of the invention, a stop surface on the bushing engages a stop surface on the probe body when the probe is advanced from the first gauge point to the second gauge point.

According to still another alternate embodiment of the invention, multiple positions of the probe relative to the bushing are established by a detent mechanism rather than by engageable stop surfaces on the bushing and the sleeve.

BRIEF DESCRIPTION OF THE DRAWINGS

FIG. 5 is a side elevation view of the structure of FIG. 4;

FIG. 6 is a cross-sectional overall assembly view of the air gauge assembly of the invention; and FIG. 7 is an alternate gauge construction embodying the invention.

FIG. 8 is another alternate gauge construction embodying the invention.

DETAILED DESCRIPTION OF PREFERRED EMBODIMENTS

Figure 1:
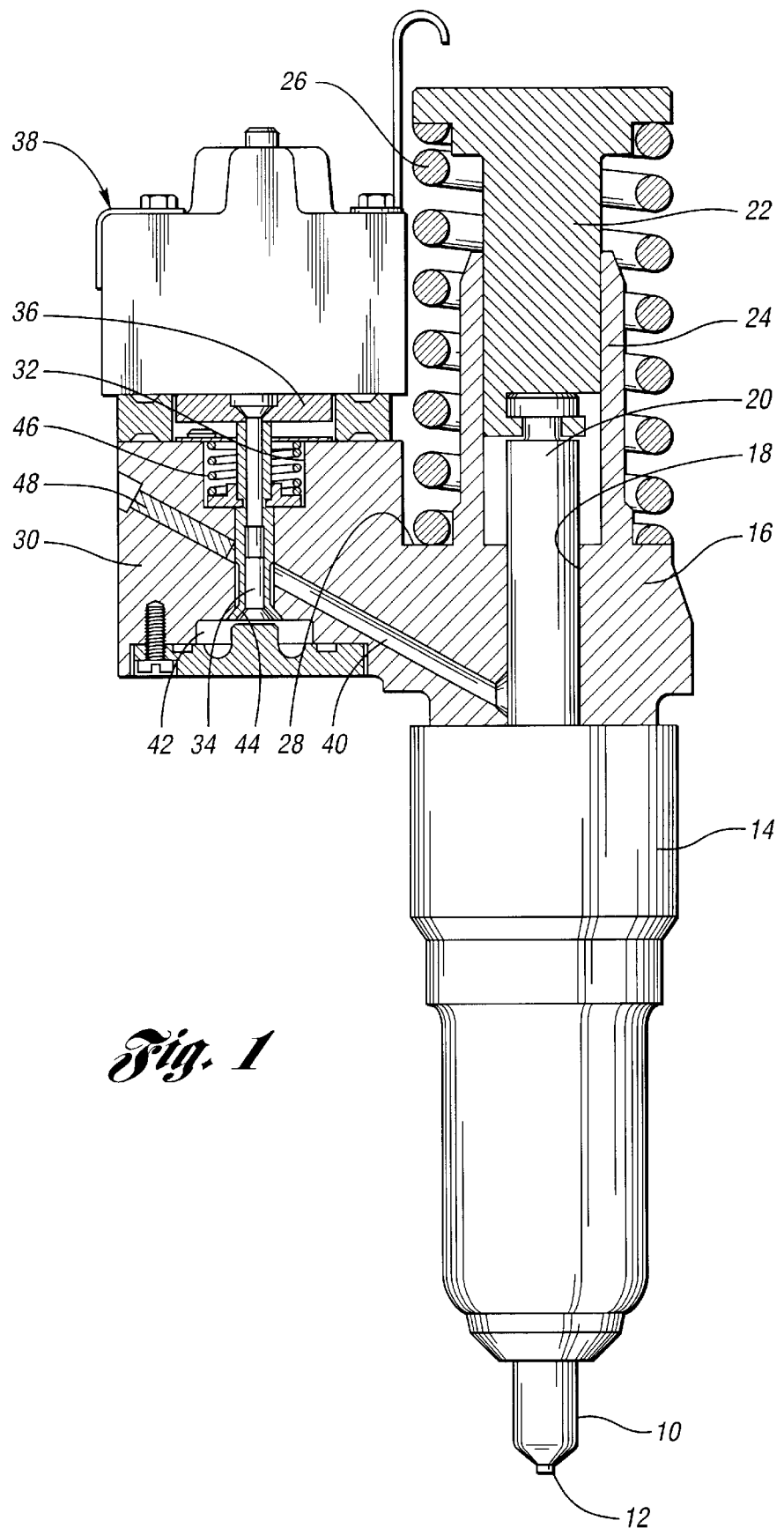
FIG. 1 is a schematic representation, partly in cross-section, of a unit pump fuel injector for an internal combustion engine, such as a diesel engine.

FIG. 1 is a schematic representation of a unit pump fuel injector for a diesel engine. It comprises a fuel injection nozzle tip 10 with nozzle orifices 12. Nozzle tip 10 is adapted to be mounted in a combustion chamber of an internal combustion engine. The nozzle tip 10 is part of a nozzle body located within a nozzle nut 14, which in turn is secured by a threaded connection to the lower end of a pump body 16. A plunger bore or opening 18 in the pump body 16 receives a pump plunger 20. A pressure chamber (not shown in FIG. 1) is defined by the plunger opening 18 and the lower end of the plunger. A cam follower 22, supported within guide sleeve 24, is reciprocated in known fashion by a camshaft and cam follower assembly (not shown).

Plunger spring 26 urges the cam follower and the plunger 20 in an upward direction. It is seated on spring seat 28 formed on the pump body 16.

A valve body 30, which in the assembly of FIG. 1 is formed integrally with the pump body 16, defines a valve chamber 32. Control valve 34 received in the valve chamber 32 is connected to an actuator armature 36 for an actuator generally shown at 38. A cross-passage 40 connects the high-pressure pumping chamber at the end of the plunger 20 with the control valve chamber 32. The control valve 34 controls the degree of communication between passage 40 and the low pressure return circuit shown in part at 42.

The valve 34 includes a valve land 44, which is closed against a valve seat on the valve body 30 when the armature 36 is drawn in an upward direction by actuator 38, as viewed in FIG. 1. Actuator 38 is energized by a solenoid that is under the control of an electronic engine controller in known fashion.

A control valve spring 46 normally urges the valve 34 to an open position, thereby normally depressurizing passage 40 at intervals between high-pressure pulses for each injection event.

The passage 40 will be described in more particular detail with reference to FIG. 2. The outward end of the passage 40 is sealed by a closure pin 48.

The pin 48 is preferably formed of shaped memory alloy (SMA) material, which has known expansion characteristics when heated. It can be inserted using minimal pressure following drilling of the passage 40. The pin then can be heated to expand the alloy, thereby forming a permanent seal that will resist leakage from the high-pressure passage 40.

FIG. 1 shows the passage 40 at the left side of the plunger 20. The cross-sectional view of FIG. 2 is oriented to show the passage 40 at the right-hand side of the plunger 20.

Figure 2:
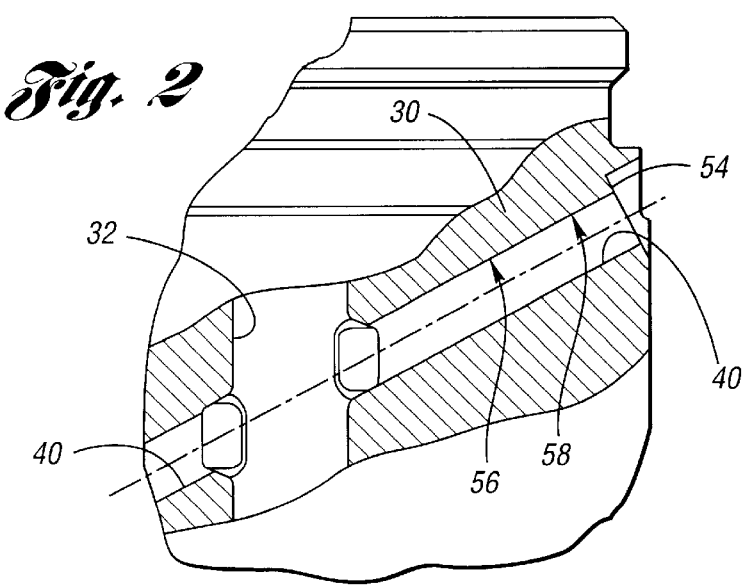
FIG. 2 is an enlarged cross-sectional view of the outer end of a drilled pressure distribution passage in the injector shown in FIG. 1.
Figure 3:
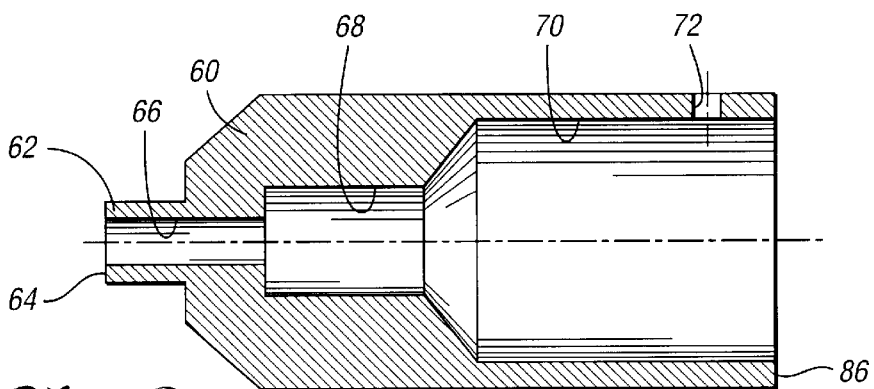
FIG. 3 is a cross-sectional view of a bushing that forms a part of the gauge of the invention.

The cross-sectional view of FIG. 2 shows the pump body and the valve body. The passage 40 is only partly visible in FIG. 2, but it communicates with the high-pressure pumping chamber at the lower end of the plunger in plunger opening 18.

FIG. 2 shows an end part of passage 40 that extends to the exterior of the housing 30, as shown at 54. The valve body 30 is machined with a flat, precisely controlled surface at 54 against which the end of the probe of the invention is engageable, as will be explained subsequently.

The end of the passage 40, as seen in FIG. 2, has two precision gauge points identified by reference numerals 56 and 58. These gauge points in one working embodiment of the invention are spaced apart by 5 mm. The distance between gauge point 58 and the precision machine surface 54 in one working embodiment is 2.5 mm. The total distance from the surface 54 to gauge point 56 is 7.5 mm. By precisely measuring the dimensions of the passage 40 at gauge points 56 and 58, the taper of the passage 40 can be determined precisely. Further, if the passage 40 exhibits out-of-roundness, that also can be detected at each gauge point.

Precision dimensional measurements at each of the gauge points are made using the measurement probe assembly of FIGS. 3, 4, 5 and 6. The assembly includes a bushing shown in FIG. 3 at 60. The bushing is generally cylindrical, as indicated, and has a reduced diameter nose portion or collar portion 62 with a precisely machined end surface 64. The bushing 60 has a central opening 66, which receives the end of a probe that will be described with reference to FIG. 6.

A spring chamber 68 is coaxially aligned with opening 66. A probe body chamber 70 of larger diameter than the diameter of opening 68 receives a probe body. A tapped opening 72 is formed at the right-hand end of the bushing, as shown at 72. This receives a stop element, as will be described with reference to FIG. 6.

Figure 4:
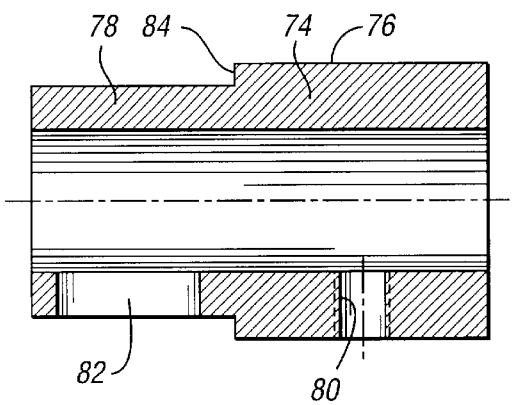
FIG. 4 is a cross-sectional view of a sleeve that is assembled on the probe body of the invention.

A stop sleeve 74 for the probe assembly of the invention is shown in FIGS. 4 and 5. It includes a large diameter portion 76 and a smaller diameter portion 78. A threaded opening 80 is formed in the large diameter portion to receive a set screw, as will be described with reference to FIG. 6. The smaller diameter portion 78 has an elongated slot 82. A precision machined shoulder 84 is formed at the interface of the large diameter portion 76 and the smaller diameter portion 78. Similarly, the end surface of the bushing, seen in FIGS. 3 and 6 at 86, is precisely machined so that when the probe is assembled, the travel of the probe within the passage 40 is controlled, shoulder 84 being engageable with the end surface 86.

As seen in FIG. 6, a probe 90 has an end that can be inserted in the opening 40 following a drilling operation and following a machining operation to precisely establish flatness of surface 54 on the valve body 30. The probe 90, which extends through opening 66 in bushing 60, includes a probe body 92 of larger diameter, as seen in FIG. 6. Probe body 92 is received within a central opening formed in the sleeve 74. It is held fast within the sleeve 74 by a set screw 94 in threaded opening 80. Reduced diameter portion 78 of sleeve 74 is received in the open end of bushing 60. A stop screw 95 is received in opening 72 in the large diameter portion of the bushing 60. Stop screw 95 is received in slot 82 formed in the sleeve 74. This prevents rotation of the probe with respect to the bushing while allowing movement of the probe in an axial direction with respect to the bushing 60.

The probe 90 and the probe body 92 are formed with an internal air pressure flow passage 100. Although it is contemplated that shop air normally available in a manufacturing facility can be used to pressurize passage 100, other gases under pressure could be used if that is desired.

Passage 100 extends to a fitting 102 to facilitate attachment with an air line schematically shown at 104. A column gauge and pressure transducer of conventional design is connected to the air line 104, as shown at 106. The measured pressure in line 104 is observed by means of a suitable readout device 108.

The end of the probe 90 has an air flow port or metering orifice 110, which connects the air flow passage 100 with the interior of the pressure passage to be measured, such as the passage 40 previously described. During operation, the probe end 90 is inserted into the passage 40 until the end surface 64 of the bushing 60 engages surface 54 on the valve body. At that point, the orifice 110 is located precisely at gauge point 58 seen in FIG. 2. A back pressure is developed because of the flow restriction provided by the clearance between the probe end 90 and the walls of the passage 40. As the sleeve 74 is advanced, the probe 90 will advance farther into the passage 40 until the orifice 110 is precisely located at gauge point 56, seen in FIG. 2. At that point, another reading of the back pressure in passage 100 is obtained and recorded by the transducer 106 and the readout device 108. When both readings are obtained, the end of probe 90 can be withdrawn and used in a subsequent inspection procedure for another injector part.

The travel of the probe relative to the surface 54 is controlled by the spacing between the shoulder 84 of the sleeve 74 and the end surface 86 of the bushing. In a working embodiment of the invention, that distance can be 5 mm, which is precisely the distance between the gauge points 56 and 58.

The probe is advanced within the bushing 60 against the opposing force of spring 112, which is seated on a shoulder 114 of the probe body 92.

FIG. 7 shows an alternate gauge construction embodying the invention. It has elements that correspond to elements of FIG. 6, and its mode of operation is essentially the same as the mode of operation of the gauge of FIG. 6. Elements in FIG. 7 that have counterpart elements in FIG. 6 are identified by similar reference numerals, although prime notations are added.

The gauge of FIG. 7 includes an adjustable nose 62' that is threadably received in a threaded opening in bushing 60'. The nose can be locked securely in place after it is properly adjusted relative to bushing 60'. Jam nut 62" is used for that purpose.

The left end of the nose 62' engages machined surface 54 on the valve body 30 as the end of probe 90' is inserted in the passage 40 to be measured. The right end of the nose 62' serves as a shoulder for spring 112'. The spring 112' is seated on shoulder 114' of the probe body 92'. A desired preload for the spring 112' then can be established.

The bushing 60' has a shoulder 60" that is engaged by shoulder 114' when the spring is compressed. The distance between shoulder 114' and shoulder 60" may be the same as the spacing between shoulder 84 and end surface 86 of FIG. 6 (i.e., 5 mm). The distance between orifice 110' and the end of nose 62' may be the same as the spacing between orifice 110 and the end surface 64 of FIG. 6 (i.e., 2.5 mm).

As in the case of the design of FIG. 6, the probe of FIG. 7 has an internal gas flow passage (not shown) which communicates with orifice 110'.

The probe body 92' is received in a handle 74', which may be knurled if that is desired. Stop screw 95' is threaded into probe body 92' rather than into the bushing as in the case of the FIG. 6 version. It extends through a slot 82' in bushing 60'.

FIG. 8 is another alternate construction having elements with features common to the construction of FIG. 6. The common elements are identified with the same reference numerals used in FIG. 6, but prime notations are added.

In the construction of FIG. 8, sleeve 74" is held fast on probe body 92" by set screw 94' in threaded opening 80' in sleeve 74". Sleeve 74" is slotted at 82". Bushing 62''' is provided with a threaded opening 72' which receives screw 95". Slot 82" receives screw 95" so rotary motion of bushing 60''' relative to probe body 92" is avoided.

The axial position of the bushing 60''' relative to the probe 90" is defined by a detent mechanism generally shown at 116. The detent mechanism comprises a spring loaded plunger 118 in an externally threaded detent cage 120, which is secured in a threaded opening in bushing 60'''. Plunger 118 registers with any one of multiple detent recesses 122 in sleeve portion 78'.

In the embodiment of FIG. 8, multiple gauge points at which measurements are taken are determined by the spacing of detent recesses 122. As in the case of the embodiments of FIGS. 6 and 7, the end surface 64' on collar portion 62''' is brought into engagement with surface 54 when a measurement is made. The bushing 60''' can be adjusted from one detent position to another relative to the probe body as multiple measurements are made at the gauge points in passage 40 defined by the spacing of detent recesses 122.

Having described one embodiment of the invention, it will be apparent to persons skilled in the art that modifications may be made without departing from the scope of the invention. All such modifications and improvements thereof are intended to be covered by the following claims.

What is claimed is:

1. A gauge assembly for measuring a cylindrical hole in a workpiece, the gauge assembly comprising:

a body portion and a cylindrical probe attached thereto and extending therefrom, the probe having a diameter sized to allow the probe to be inserted into a hole in a workpiece to be measured, the probe being provided with at least one radial port connected to a source of pressurized gas so that back pressure of the gas upstream of the port varies as a function of the local diameter of the hole in the region of the port;

a bushing oriented about the probe and attached to the body portion in a manner to enable axial movement of the probe between an extended position and a retracted position, the bushing defining an abutment face to engage a region of the workpiece adjacent the hole; and a spring biasing the bushing relative to the body portion to cause the probe normally to be in the retracted position with the radial port spaced a first distance from the abutment;

whereby a user may insert the probe into the hole in the workpiece to be measured and take pressure measurements at two axial positions, the first axial position corresponding to the first distance when the probe is inserted into the hole sufficiently to cause the abutment face to engage the workpiece and a second axial position when the user urges the body portion axially inward sufficiently to cause the spring to compress allowing the probe to move to an extended position placing the probe port a second distance from the abutment face.

2. The gauge assembly of claim 1 wherein the bushing is provided with a cylindrical tubular end which terminates in the abutment face.

3. The gauge assembly of claim 1 further comprising a tubular sleeve affixed to and mounted about the body portion interposed between the body portion and the bushing.

4. The gauge assembly of claim 3 wherein the bushing is provided with a stop face at an axial end of the bushing opposite the abutment face and the sleeve is provided with a corresponding stop face for engaging the bushing stop face when the user has inwardly urged the body portion inwardly with sufficient force to compress the spring.

5. An gauge assembly for measuring a cylindrical hole in a workpiece, the air gauge assembly comprising:

a body portion and a cylindrical probe attached thereto and extending therefrom, the probe having a diameter sized to allow the probe to be inserted into a hole in a workpiece to be measured, the probe being provided with at least one radial port to be coupled to a source of pressurized air so that the pressure of air delivered to the port varies as a function of the local diameter of the hole in the region of the port;

a bushing having a collar portion oriented about the probe and terminating in an abutment face at a distal end of the bushing, and a proximate end region which is attached to the body portion in a manner allowing the bushing to be axially adjusted between an extended and a retracted position, the abutment face being configured to engage a region of the workpiece adjacent the hole; and a spring elastically biasing the bushing relative to the body portion to cause the probe normally to be in the retracted position with the radial port spaced a first distance from the abutment face;

whereby a user may insert the probe into the hole in the workpiece to be measured and take pressure measurements at two axial positions, the first axial position corresponding to the first distance when the probe is inserted into the hole sufficiently to cause the abutment face to engage the workpiece and a second axial position when the user urges the body portion axially inward with sufficient force to cause the spring to compress allowing the probe to move to an extended position placing the probe port a second distance from the abutment face.

6. The gauge assembly of claim 5 wherein the abutment face lies in a plane perpendicular to a central axis of the probe.

7. The gauge assembly of claim 5 further comprising a tubular sleeve affixed to and mounted about the body portion interposed between the body portion and the bushing.

8. The gauge assembly of claim 7 wherein the bushing and the sleeve are provided with cooperating stops to mechanically limit the relative movement therebetween.

9. The gauge assembly of claim 7 wherein the bushing is provided with a stop face at a proximate end of the bushing and the sleeve is provided with a corresponding stop face for engaging the bushing stop face when the body portion is moved inwardly with sufficient force to fully compress the spring.

10. The gauge assembly of claim 7 wherein the bushing includes an annular body to which the collar portion is affixed enabling the location of the abutment face relative to the port in the probe to be set by a user.

11. The gauge assembly of claim 7 wherein the bushing and the sleeve are each provided with cooperating stops to mechanically limit relative movement therebetween.

12. A gauge assembly for measuring a cylindrical hole in a workpiece, the gauge assembly comprising:

a probe having a central gas passage, a radial port at one end of the probe communicating with the gas passage;

a bushing surrounding the one probe end, an end abutment on the bushing engageable with a surface on the workpiece as the probe is inserted into the cylindrical hole whereby the radial port is positioned at a gauge point in the cylindrical hole;

a sleeve surrounding the probe, the sleeve and the probe being disposed for relative axial movement in relative radial disposition; and a detent mechanism for establishing axial positions of the probe relative to the bushing whereby multiple positions of the radial port at selected gauge points in the hole are defined.

13. The gauge assembly set forth in claim 12 wherein the sleeve is fixed to the probe to prevent relative axial movement thereof.

14. The gauge assembly set forth in claim 13 wherein the sleeve and the bushing have registering elements defining a last motion connection therebetween for preventing relative rotary movement thereof.

15. A method of measuring the taper of a cylindrical hole formed in a body comprising the steps of:

providing a bushing and a probe body portion and a cylindrical probe attached to the body portion and freely extending therefrom, the probe having a diameter sized to allow the probe to be inserted into a hole in a workpiece to be measured, the probe being provided with at least one radial port to be coupled to a source of pressurized gas so that the pressure at the port varies as a function of the local diameter of the hole in the axial region of the port, the bushing being oriented about the probe and attached to the body portion in a manner to be axially shiftable between an extended and a retracted probe position, the bushing defining an abutment face to engage a region of the workpiece adjacent the hole, a spring elastically biasing the bushing relative to the spindle to cause the probe normally to be in the retracted position;

inserting the probe into the hole in the workpiece sufficiently to cause the abutment face to engage the workpiece;

taking a pressure measurement with the probe in the retracted position;

urging the spindle axially inward with sufficient force to cause the spring to compress allowing the probe to move to the extended position;

taking a pressure measurement with the probe in the extended position; and evaluating the pressure measurements taken with the probe located at the retracted and extended positions to determine the geometry of the hole.

* * * * *